G. W. BAIER.
AUTOMATIC FOUNTAIN.
APPLICATION FILED DEC. 18, 1911.
1,042,379.
Patented Oct. 29, 1912.
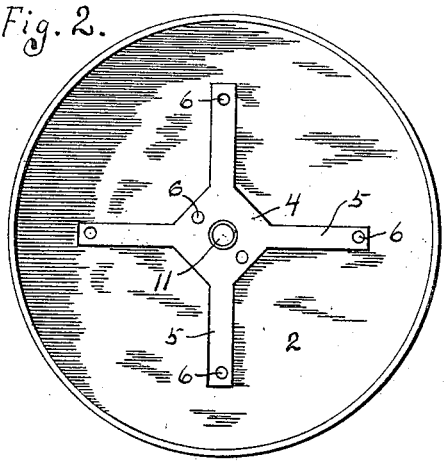
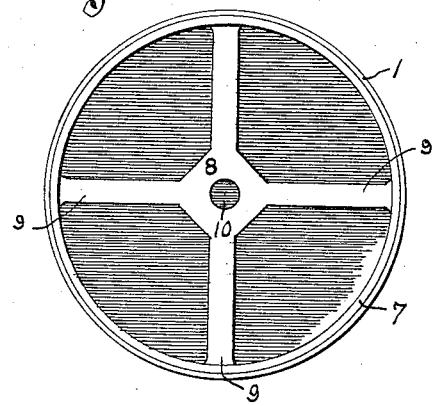
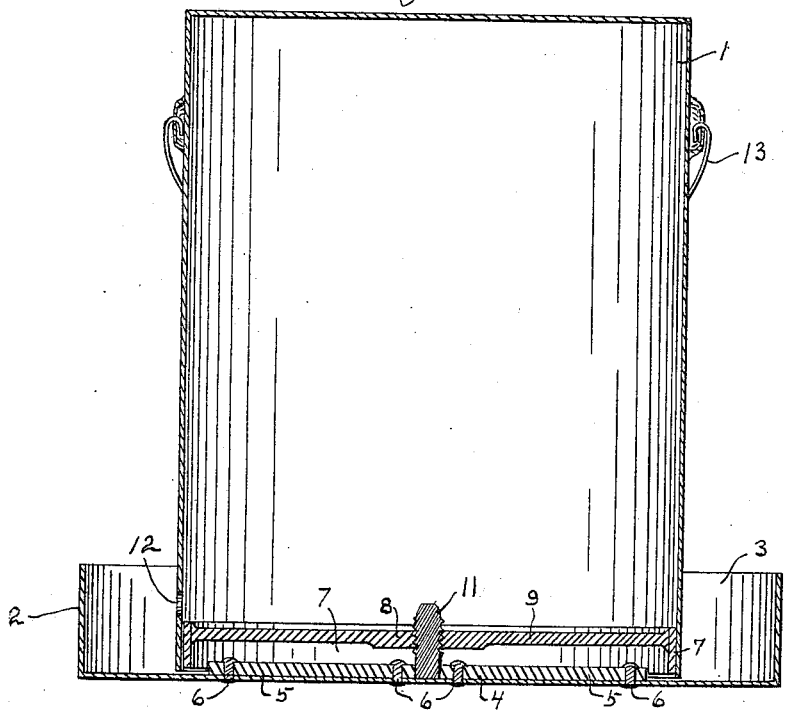
Witnesses
R. W. E. Mitchell
W. T. Palmer
Inventor
George W. Baier,
By Walter N. Haskell,
his Attorney

UNITED STATES PATENT OFFICE.

GEORGE W. BAIER, OF CISSNA PARK, ILLINOIS.

AUTOMATIC FOUNTAIN.

1,042,379.

Specification of Letters Patent.   Patented Oct. 29, 1912.

Application filed December 18, 1911. Serial No. 666,437.

*To all whom it may concern:*

Be it known that I, GEORGE W. BAIER, a citizen of the United States, residing at Cissna Park, in the county of Iroquois and State of Illinois, have invented certain new and useful Improvements in Automatic Fountains, of which the following is a specification.

My invention has reference to automatic drinking fountains, of that class which are employed to furnish a supply of water for poultry or the smaller kinds of animals. It is simple and durable in construction, and convenient of operation.

My device consists primarily of an inverted can or pail, and a pan in which such can is removably held, the pan extending a sufficient distance beyond the can to form a drinking-trough, and means of communication being provided between the can and trough through which the flow of water from the can into the trough is self-controlled.

In the drawings: Figure 1 shows my device in medial vertical section. Fig. 2 is a plan view of the pan 2. Fig. 3 is a plan view of the can 1, in inverted position.

1 represents a can, open at its lower end, and located centrally of a shallow pan 2, the diameter of the pan 2 exceeding that of the can sufficiently to provide a trough 3 around the lower part of the can. Centrally of the pan 2 is a plate 4 having radial arms 5, such plate and arms being secured to the bottom plate of the pan by means of rivets 6 or similar means.

Fixed in the lower end of the can 1 is a metal hoop 7, and centrally thereof a plate 8 is supported by means of arms 9 fixed at their outer ends to said hoop. In the center of the plate 8 is an opening 10, provided with threads to correspond with those on a pin 11, fixed centrally of the plate 4. By inserting the pin in such opening and turning the can so as to cause the threads of the opening to engage those of the pin such can will be drawn downwardly until the edge thereof is in close contact with the bottom of the pan 2. A small amount of water in the pan then renders such can air-tight, except for a small opening 12 in the side of the can, through which the water on the interior of the can is permitted egress into the trough 3. When the height of the water in the trough is such as to cover said opening the flow of water is interrupted thereby, to be again resumed when the water is reduced sufficiently to uncover the opening. When the can 1 is empty it can be easily replenished by inverting my device and unscrewing the pan 2, whereupon the can can be provided with a new supply of water. The pan is then replaced, and the device returned to its normal position for use. For convenience in handling the can 1 may be provided with a bail 13.

The hoop 7 provides a strengthening means for the lower end of the can 1, in addition to forming a support for the arms 9, and the plate 4 and arms 5 not only serve as a means of support for the pin 11, but they also provide a strengthening means for the bottom plate of the pan 2, preventing such plate from being forced out of shape by the weight of the can and contents, and insuring a close contact between the lower end of the can and the bottom of the pan at all times.

What I claim as my invention, and desire to secure by Letters Patent of the United States, is:

1. In a device of the class named, a can, open at its lower end, and provided with an outlet port near the lower end thereof; a pan surrounding the lower end of said can, and forming a trough about the same, extending higher than said outlet; a plate, supported centrally of the lower end of said can and provided with a threaded perforation; and a threaded pin fixed in said pan, centrally thereof, and adapted to engage the opening in said plate.

2. A device of the class named, comprising a can, open at its lower end, and provided with an outlet port near the lower end thereof; a pan surrounding the lower end of said can, and forming a trough about the same, extending higher than said outlet; a hoop fixed in the lower end of said can; a plate supported centrally of said hoop, and provided with a central threaded opening; a plate fixed in the bottom of said pan centrally thereof, and provided with a plurality of radial arms, also fixed to the bottom plate of said pan; and a threaded pin, supported centrally of said last-named plate, and adapted to be engaged by said perforated plate, to bring the lower edge of said can into contact with the bottom plate of the pan.

In testimony whereof I affix my signature in presence of two witnesses.

GEORGE W. BAIER.

Witnesses:
SAM A. BROWN,
J. A. HARRELL.

Copies of this patent may be obtained for five cents each, by addressing the "Commissioner of Patents, Washington, D. C."